July 4, 1939.  L. M. MYERS  2,164,539
ELECTROOPTICAL DEVICE FOR CONTROLLING LIGHT
Filed April 25, 1935

INVENTOR
LEONARD M. MYERS
BY
ATTORNEY

Patented July 4, 1939

2,164,539

UNITED STATES PATENT OFFICE 2,164,539

ELECTROOPTICAL DEVICE FOR CONTROLLING LIGHT

Leonard Morris Myers, Middlesborough, England, assignor to Radio Corporation of America, a corporation of Delaware Application April 25, 1935, Serial No. 18,267
In Great Britain May 28, 1934

3 Claims. (Cl. 88—61)

This invention relates to television and like receivers and has for its object to provide an improved electro-optical light controlling device suitable for use in television and like receivers.

The invention is based upon a phenomenon exhibited by quartz and the like electro-optical active material, the phenomenon being that if electric stress is applied in the direction of the electric axis of the crystal a bi-refringent action is introduced.

The present invention provides an electro-optical translating device in which this phenomenon is utilized in such manner as to produce relatively large changes of light values in response to applied potentials which are caused to apply electrical stresses along the electric axis of the quartz or like crystalline material utilized.

According to this invention electrical potentials to be utilized for controlling light are applied to cause electrical stresses in the direction of the electrical axes of a series of at least two quartz or like laminae which are alternately right handed and left handed and are cut with their thicknesses in the direction of the electric axis, their greatest lengths in the direction of the optical axis and their widths in the direction of the mechanical axis, these laminae being in a series in a direction at right angles to the mechanical and electrical axes and being so arranged that light passing through two adjacent laminae along their optical axes has the initial retardation of the circular components (along the optical axis) reduced substantially to zero, the series of laminae being arranged between a polarizer and an analyser which are crossed so that in the absence of applied electrical potentials the field of the polaroscope is completely extinguished. Light to be controlled is passed through the whole optical system just described.

It will be seen that with this arrangement when electrical potentials are applied extra bi-refringent action is produced and the secondary bi-refringent action between two adjacent laminae will be additive and not subtractive as is the case of the initial bi-refringence.

Figure 1:
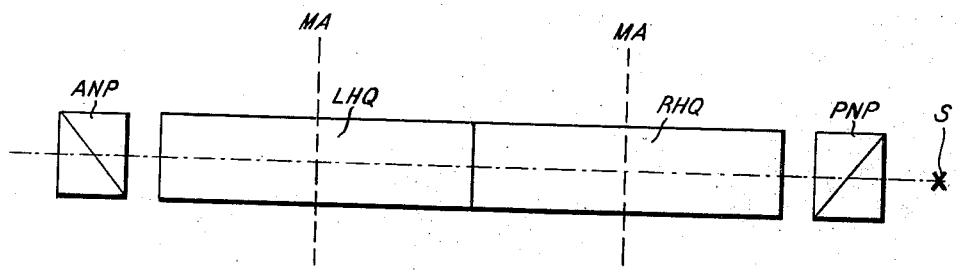
Figure 2:
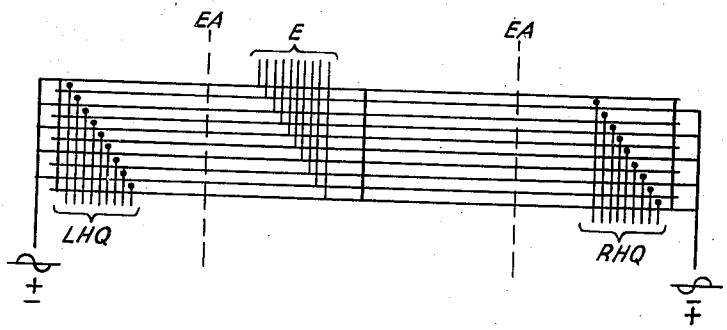

The invention is illustrated in the accompanying drawing in which Figure 1 shows schematically one embodiment of the invention and Figure 2 shows the cell arrangement of Figure 1 viewed at right angles to the electric axis.

Referring to the drawing an electro-optical light controlling device comprises a source of light S a Nicol prism PNP, a cell consisting of a number of pairs of quartz laminae LHQ and RHQ the laminae of each pair being right-handed (RHQ) and left-handed (LHQ) so that the initial bi-refringence is compensated, electrodes E for applying television or other suitable alternating potentials to produce electrical stresses in the direction of the electrical axis EA in the quartz, and a second Nicol prism ANP which is crossed with the first so that in the absence of applied electrical potentials no light passes through beyond the second Nicol prism. The mechanical axis is indicated at MA and is, of course, at right angles to the axis EA. The electrodes E may be constituted by thin sheets of metal foil between laminae as shown and, in order to secure good contact between the foils and the laminae the latter are preferably coated on the faces which are to be adjacent the foils with graphite e. g. with the graphite suspension known as "Aquadag". It will be noted from Figure 2 that the applied "polarities" i. e. the instantaneous polarities of the television or other signals are so chosen that, in operation the retardations are additive.

Having now particularly described and ascertained the nature of my said invention and in what manner the same is to be performed I declare that what I claim is:

1. An electro-optical light controlling device comprising a source of light, a polariser interposed in the path of light from said source, at least two quartz laminae which are alternately right handed and left handed and are cut with their thicknesses in the direction of the electric axis, their greatest lengths in the direction of the optical axis and their widths in the direction of the mechanical axis, those laminae being in a series in a direction at right angles to the mechanical and electrical axes and being so arranged that light passing through two adjacent laminae has the initial retardation of the circular components along the optical axis reduced substantially to zero, the series of laminae being arranged in the path of the light from said polariser, said path of light coinciding with the optical axis of all the laminae, an analyser interposed in the path of the light from the series of laminae, and means for applying electrical potentials to cause electrical stresses in the direction of the electrical axes of all of said laminae.

2. A device as claimed in claim 1 wherein there is a plurality of laminae side by side in the direction of the electrical axis.

3. A bi-refringent cell comprising a stacked plurality of dextro-rotary crystalline laminae whose greatest dimension lies along the optical axis of the laminae, conducting means to adapt said laminae to have electrical potentials applied thereto, a stacked plurality of levo-rotary crystalline laminae whose greatest dimension lies along the optical axis of the laminae, and conducting means to adapt said laminae to have electrical potentials applied thereto, said stacks of laminae being adjacent to and in contact with each other with their optical axis in register with each other.

LEONARD MORRIS MYERS.